United States Patent [19]

Terwilliger

[11] Patent Number: 4,964,552
[45] Date of Patent: Oct. 23, 1990

[54] TIRE HOLDER

[76] Inventor: Carl J. Terwilliger, Rte. 5, Box 156, 62 Woodridge Dr. West #1, River Falls, Wis. 54022

[21] Appl. No.: 368,039
[22] Filed: Jun. 16, 1989
[51] Int. Cl.⁵ .......................................... B62D 43/04
[52] U.S. Cl. ........................... 224/42.23; 224/42.21; 224/42.28; 224/42.41
[58] Field of Search ............... 224/42.23, 42.12, 42.21, 224/42.26, 42.28, 42.41, 42.06–42.08, 42.27, 42.3, 42.13

[56] References Cited

U.S. PATENT DOCUMENTS

| | | | |
|---|---|---|---|
| 1,589,955 | 6/1926 | Green | 224/42.23 |
| 1,672,356 | 5/1928 | Wasserfallen | 224/42.23 |
| 1,913,835 | 6/1933 | Golike | 224/42.23 |
| 2,661,131 | 12/1953 | Roy | 224/42.26 |
| 3,428,200 | 2/1969 | Graves et al. | 224/42.21 |
| 3,435,971 | 4/1969 | Powell | 224/42.23 |
| 3,862,696 | 1/1975 | McCauley et al. | 224/42.21 |
| 3,904,093 | 9/1975 | Hanela | 224/42.23 |
| 4,060,171 | 11/1977 | Ludwig | 224/42.23 |
| 4,087,032 | 5/1978 | Miller et al. | 224/42.23 |
| 4,174,797 | 11/1979 | Yasue et al. | 224/42.21 |
| 4,238,091 | 12/1980 | Clain et al. | 224/42.23 |
| 4,384,815 | 5/1983 | Suzuki et al. | 224/42.23 |
| 4,428,513 | 1/1984 | Delmastro | 224/42.21 |
| 4,573,855 | 3/1986 | Braswell | 224/42.23 |
| 4,805,817 | 2/1989 | Helterbrand | 224/42.23 |

FOREIGN PATENT DOCUMENTS

| | | | |
|---|---|---|---|
| 289372 | 11/1988 | European Pat. Off. | 224/42.23 |
| 57472 | 3/1986 | Japan | 224/42.23 |

Primary Examiner—Henry J. Recla
Assistant Examiner—Keith Kupferschmid
Attorney, Agent, or Firm—Palmatier & Sjoquist

[57] ABSTRACT

The present tire holder includes a tire mounting yoke swingably connected to the underside of a vehicle and a swingable L-shaped lever connected to the yoke. When the spare tire is to be released from the tire holder, the yoke swings down to allow the spare tire to slide down the yoke and be deposited at an accessible location on the periphery of the vehicle. When the spare tire is to be mounted in the tire holder, the L-shaped lever is pivoted and raised simultaneously to push the spare tire into the tire holder and swing the tire holder to a fixed horizontal position where the lever is fastened to an arm which swings and snaps into the lever.

19 Claims, 5 Drawing Sheets

TIRE HOLDER

The present invention relates to tire holders for mounting spare tires to vehicles and, more particularly, to tire holders for mounting spare tires to the underside of vehicles.

BACKGROUND OF THE INVENTION

A conventional tire holder for a pickup truck typically includes a bracket and bolt type connection. The bracket traverses the diameter of a spare tire, which is sandwiched between the bracket and a frame cross-bar or the gas tank of the pickup truck. Bolts connect the ends of the brackets to frame members disposed on both sides of the gas tank. The bracket may include a cross member for bearing against the metal wheel of the spare tire.

One of the problems with such a bolted, bracketed tire holder is that it is troublesome to mount and remove a tire. A pickup truck tire is heavy and large in diameter and thickness and is thus difficult to lift up to its stored position underneath the gas tank. Such a lifting operation is especially laborious when one is lying on his or her back underneath the truck and simultaneously attempting to thread bolts through the bracket and secure the bolts while holding up the tire.

Another problem with such a conventional tire holder is that the bracket and bolt type connection is readily rendered inoperable by rust. As with other bolts mounted on the undersides of vehicles, the bolts of the conventional tire holders are exposed to dirt, salt and moisture. Unfortunately, it is not until one's truck has a flat tire that one is aware of the condition of his or her rusted tire holder and the unavailability of his spare tire. Another problem with a conventional tire holder is that one must invariably move into a supine position to mount or remove a tire. Such a position is undesirable for today's buyers who utilize their trucks as all around vehicles not only for hauling but for daily commuting, pleasure, and travel.

SUMMARY OF THE INVENTION

A feature of the present invention is a swingable tire holder affixed underneath the bed of a pickup truck wherein one portion of the tire holder swings relative the frame of the pickup truck and another portion of the tire holder swings relative the first swingable portion to push the tire being mounted up and into the tire holder as the first swingable portion swings upwardly to mount the tire holder to the pickup truck.

Another feature of the present invention is the provision in such a tire holder, of the second swingable portion being an L-shaped lever with one lever extension bearable against the spare tire and with the second lever extension being extendable to the periphery of the pickup truck to allow a tire to be pushed into the tire holder while the tire holder is simultaneously being swung up against the frame of the pickup truck to a fixed position.

Another feature of the present invention is the provision in such a tire holder, of a hooked, slotted swing arm swingable toward the L-shaped swing lever to connect the tire holder to the pickup truck and swingable away from the lever to a disengaged, out-of-the-way position.

Another feature of the present invention is the provision in such a tire holder, of a three point tire retaining arrangement which is independent of and spaced from the hooked swing arm so that the tire is disposed deeply in the truck in the factory appropriate position for desired weight distribution and so that the swing arm is disposed in a readily accessible position on the periphery of the truck.

Another feature of the present invention is the provision in such a tire holder of a longitudinally adjustable tire supporting channel, a vertically and transversely adjustable yoke member, and a vertically adjustable swing arm whereby the tire holder may mount tires of different diameters and thicknesses to a great variety of truck models.

Another feature of the present invention is the provision in such a tire holder of a lever extension being adaptable to cooperate with a tire iron to further extend the leverage and increase the ease of both pushing the tire into the tire holder and swinging the tire holder up into the frame of the pickup truck.

An advantage of the present invention is that a massive truck tire is quickly and easily mounted in and removed from a carrying position in a one-step operation with a minimum amount of lying, crawling, crouching or lifting.

Another advantage of the present invention is that the tire holder carries a spare tire at an unobtrusive factory appropriate position yet is locked to the pickup truck at an accessible portion of the truck's frame.

Another advantage of the present invention is that it is adjustable to carry tires of different widths and thicknesses.

Another advantage of the present invention is that it is readily adaptable to a large majority of the American or foreign made pickup trucks or 4×4 vehicles.

Another advantage of the present invention is that it is simple and inexpensive to manufacture, install and operate.

Another advantage of the present invention is that, since the lever extensions provide a great amount of leverage on the pivotable connections, the pivotable connections are workable even when rusted.

Another advantage of the present invention is that a large portion of the tire holder is out of sight and hence does not detract from the aesthetic appeal of the vehicle.

Another advantage of the present invention is that it is compatible with cross-bar trailer hitches.

DETAILED DESCRIPTION OF THE PREFERRED EMBODIMENTS

Figure 1:
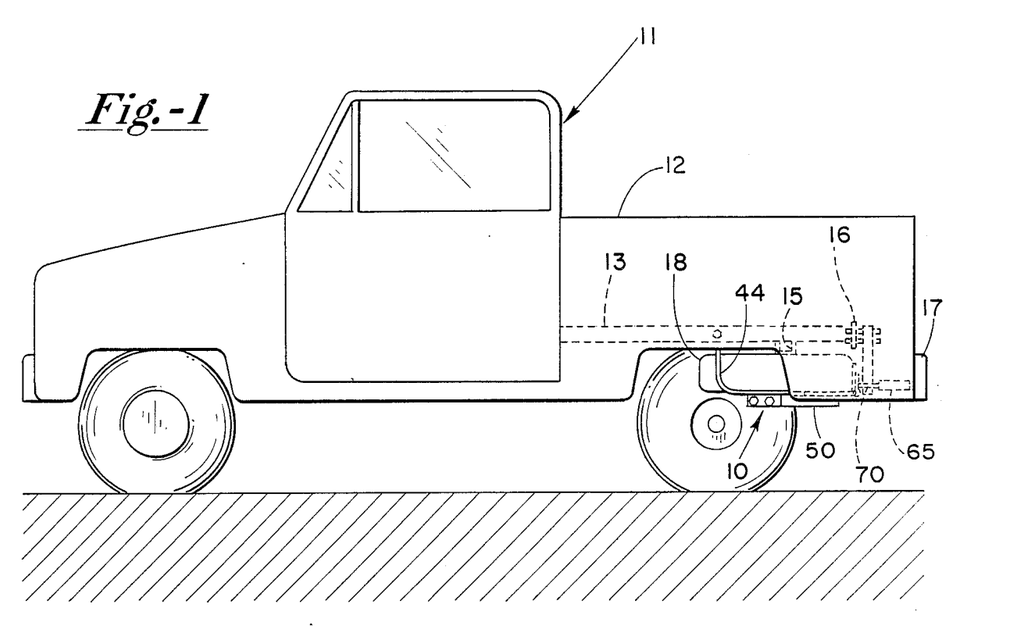
FIG. 1 is an elevation view of a pickup truck with the left rear tire removed.

The present tire holder 10 is affixed to a pickup truck 11 underneath the box 12. The pickup truck 11 includes a pair of respective longitudinally extending, U-channeled, frame members 13, 14 and a transverse, tire abutting bar 15. The conventional pickup truck 11 also includes a transverse frame member 16 extending transversely across a rear portion of the pickup truck 11. The transverse frame member 16 typically runs parallel to and near a rear bumper 17 of the truck 11. The tire holder 10 carries a spare tire 18.

Figure 2:
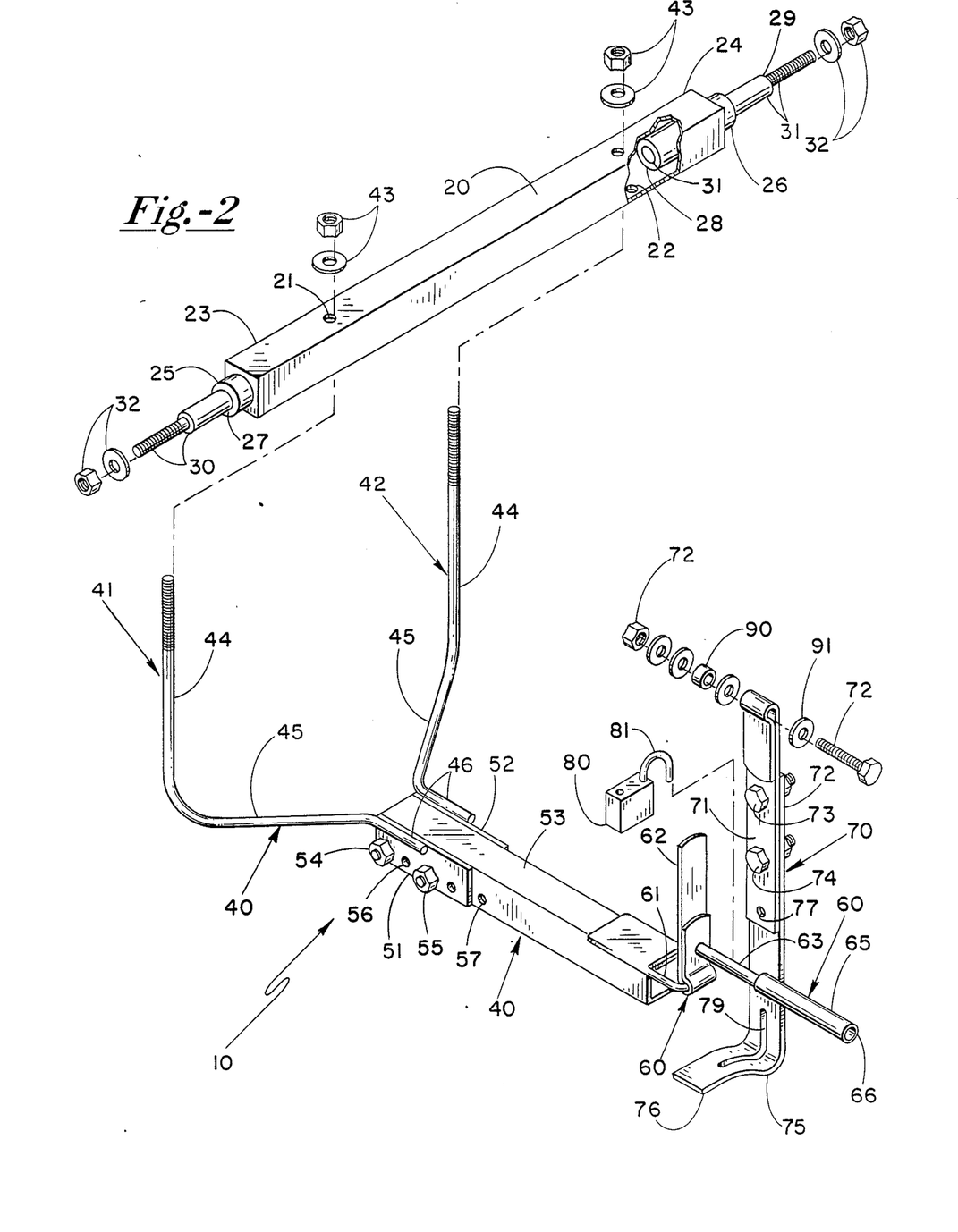
FIG. 2 is a partially exploded, partially broken away isometric view of the tire holder shown in FIG. 1.
Figure 3:
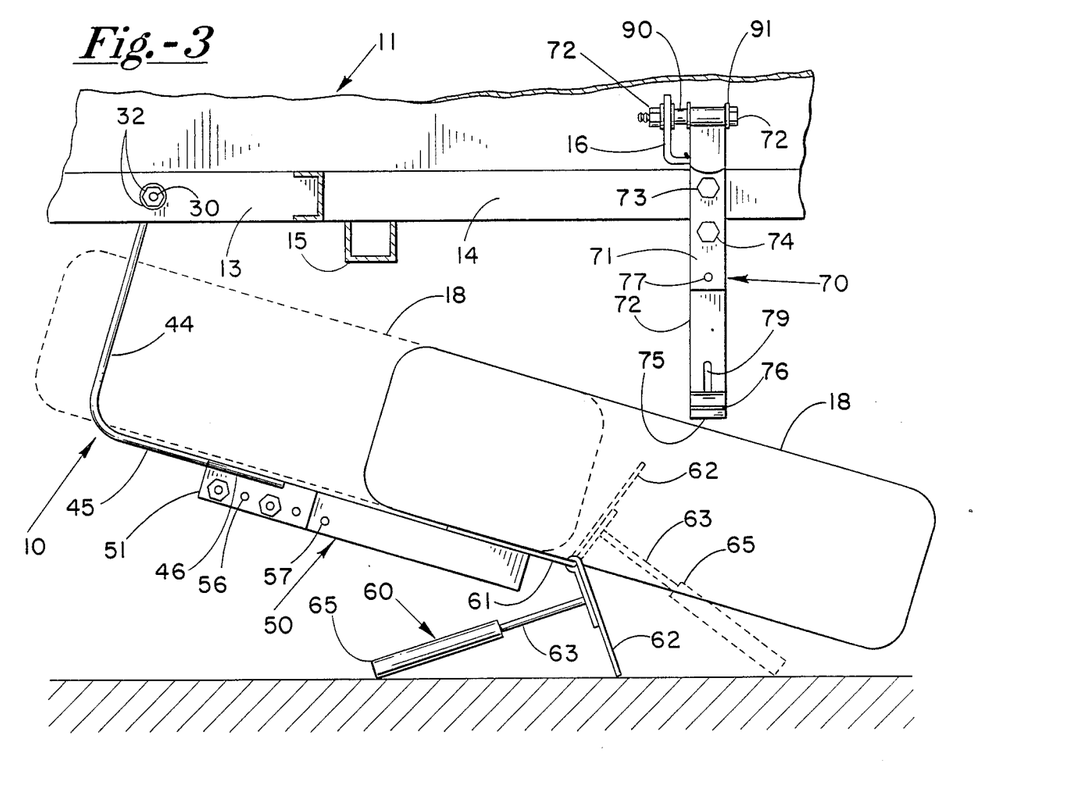
FIG. 3 is a partially phantom, detail, elevation view of the tire holder of FIG. 1 being swung away from the pickup truck.
Figure 4:
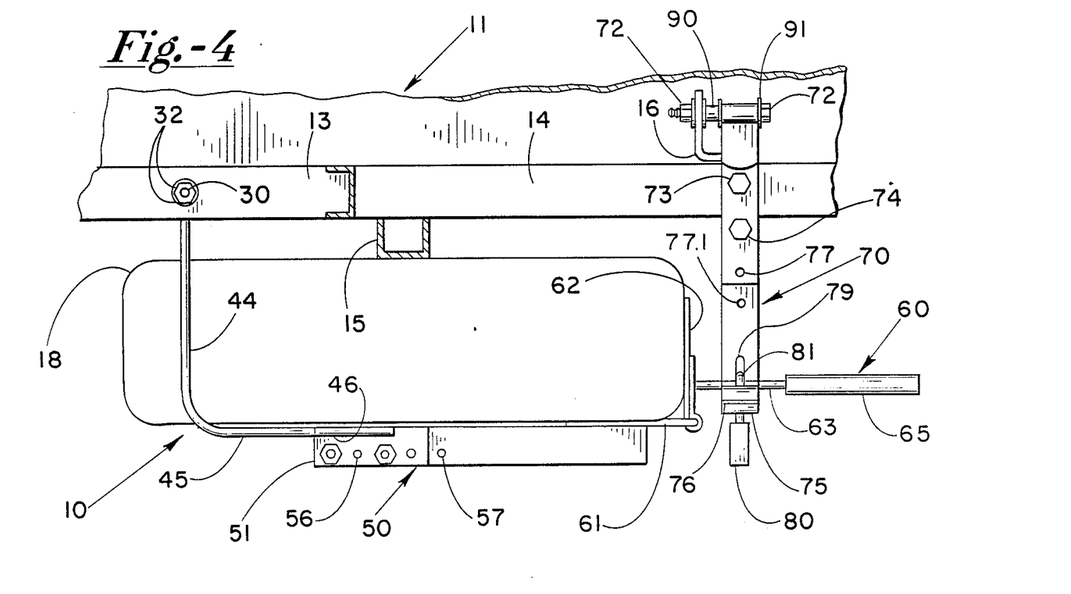
FIG. 4 is a detail elevation view of the tire holder of FIG. 1.

As shown in FIGS. 2-4, front, pivotable, square cross-sectional, open ended transverse tube 20 is disposed between U-channel frame members 13, 14 and includes a set of yoke-receiving apertures 21, 22 formed therein at equidistance from their respective tube ends 23, 24. In each of the open ends 23, 24 the pivotable tube 20 receives a pair of transverse conduits 25, 26. Each of the conduits 25, 26 extends from its respective rod-receiving apertures 21, 22 to protrude one to three inches from its respective tube end 23, 24. Each of the conduits 25, 26 is welded in its respective tubular end 23, 24 and each of the conduits 25, 26 includes respective outer and inner conduit ends 27, 28.

Each of the conduits 25, 26 is rotatably mounted about one of two respective transverse support rods 30, 31 rigidly affixed to its respective longitudinal frame member 13, 14. Each of the rods 30, 31 is removably and rigidly mounted to its respective member 13, 14 by locking bolt and washer means 32. Each of the rods 30, 31 includes a shoulder 29 for bearing against an inside face of its respective truck frame member 13, 14. Each of the rods 30, 31 typically extends from its respective longitudinal frame member 13, 14 to terminate and lie generally flush with inner conduit end 27 of each of the conduits 25, 26. The conduits 25, 26 are only slightly greater in diameter than rods 30, 31 to provide a large rotating bearing surface therebetween to distribute pressure and wear and tear over a greater surface area.

A vertically adjustable yoke 40 is rigidly affixed to the pivotable tube 30 by means of washers and lock nuts 43. The yoke 40 includes a pair of respective tire retaining yoke members 41, 42 cooperable with respective apertures 21, 22 formed in tube 20. Each of the yoke members 41, 42 is affixed to the tube 30 via the locking nut and washer means 43. Each of the yoke rod members 41, 42 typically includes a tire retaining, downwardly extending rod portion 44 and an integral, tire supporting portion 45 extending inwardly and rearwardly from the lower end of rod portion 44. Rod portions 45 have integral rear ends 46.

The pair of respective front apertured plates 51, 52 are rigidly affixed such as by welding to the rear ends 46 of the yoke rod members 41, 42. A rear apertured square cross-sectional tube 53 is mountable between apertured plates 51, 52 so that apertures 56 of plates 51, 52 are alignable with apertures 57 of rear tube 53 and so that the channel member 50 may be shortened or lengthened in increments according to the apertures 56, 57. Typically, a pair of bolts 54, 55 are received in cooperating apertures of the plates 51, 52 and tube 53 to rigidly affix the tube 53 between the plates 51, 52 and fix the length of the channel member 50.

An L-shaped lever 60 is pivotally connected to the rear end of the channel member 50 via a U-shaped pivot pin 61 rigidly affixed to the rear end of channel tube 53. The L-shaped lever 60 includes a tire retaining bar 62 pivotally mounted to pin 61. A hook receiving rod 63 is rigidly affixed at approximately a right angle to bar 62 near the pivot pin 61. A pair of welded, bent sections of the bar 62 form an aperture for receiving the pivot pin 61 and the width of the two bar sections is approximately equal to or slightly lesser than the length of the transverse portion of the U-shaped pivot pin 61 to minimize transverse movement of lever 60 relative the channel member 50. A handle portion 65 of the lever 60 is rigidly affixed to a rear end of the hook receiving rod 63 and includes an axial bore 66 for receiving the pointed or tapered end of a conventional tire iron.

A vertically adjustable, two-piece, hooked, slotted, pivotable swing arm 70 is pivotally affixed to transverse frame member 16. The swing arm 70 includes an upper apertured bent plate 71 which is pivotally mounted to the transverse frame member 16 via a locking bolt and washer means 72.1. The apertures 77 of plate 71 are alignable with the apertures 77.1 of a lower, hooked, apertured, slotted plate 72 so as to receive a pair of bolts 73, 74 so that the swing arm 70 may be shortened or lengthened. A lower portion of plate 72 includes a hook portion 75 for seating the rod 63, and a rounded, raised, resilient end portion 76 which forms an undulating section with portion 75 so as to resiliently snap rod portion 63 into the seat 75. The low portion of bar 72 further includes a slot 79.

As shown in FIGS. 2 and 4, a padlock 80 includes a U-shaped pin 81 which is insertable in slot 79 and about the hook receiving rod portion 63 to lock the lever 60 to the swing arm 70. The body of the padlock 80 is thicker than the width of the slot 79 so that the padlock 80 is not insertable through slot 79.

The bolt and washer means 72.1 includes a spacer or bushing 90 to be disposed between the swing arm 70 and transverse frame member 16. Bolt and washer means 72.1 also include a plurality of washers 91 to render the swing arm 70 frictionally swingable relative the frame member 16. The swing arm 70 is swingable so as to be disposed parallel to the near bumper 17 to allow access to the tire.

For installation purposes, it should be noted that the tire holder 10 is mountable to different truck makes and models which may have frame members 13, 14 spaced at varying distances. Although typically the rods 30, 31 terminate at conduit ends 27, the rods 130, 131 may be disposed outwardly of end 27 when the distance between frame members 13, 14 are greater than usual. Such a transversely slideable relationship between the rods 30, 31 and the conduits 25, 26 allow a tire holder 10 of a certain dimension to accommodate a wide variety of different trucks.

It should further be noted that the swing arm 70 is mountable on a truck independently from the rods 30, 31. Such an arrangement allows the tire 18 to be disposed at the factory appropriate position and the swing arm 70 to be disposed at an accessible location on the periphery of the truck. If desired, the handle portion 65 of the lever 60 is seatable and lockable in the seat 75 to further extend the spacing between the swing arm 70 and rods 30, 31, or rod portion 63 may be lengthened.

The tire holder 10 mounts tires of different diameters by adjusting the channel member 50. Tires of different thicknesses are accommodated by adjusting rods 41, 42 relative the transverse tube 20 and by adjusting the height of the swing arm 70.

It should also be noted that the tire holder 10 is compatible with cross-bar trailer hitches by mounting the transverse tube 20, conduits 25 and rods 30, 31 at a slight oblique angle relative frame members 13, 14 and by mounting the swing arm 70 slightly off center. Alternatively, instead of disposing the tube 20 obliquely from the frame members 13, 14, the rod extensions 40, 41 or any portion thereof may be bent slightly to position the channel member 50 somewhat off center.

In operation, to remove the spare tire 18 from the tire holder 10, the padlock 80 is removed from the swing arm 70 and the handle 65 of the lever 60 is grasped and raised so as to lift the hook-receiving rod portion 63 out of the seat 75 so that the swing arm 70 may be swung away from the lever 60. Subsequently, the lever handle 65 is lowered. As the lever handle 65 is disengaged from the swing arm 70 and lowered, the yoke extensions 41, 42, tube 20, conduits 25 and channel 50, which act as one piece, pivot about the rods 30, 31 so that the spare tire 18 brings pressure to bear against the tire bearing lever bar 62. As the spare tire 18 bears against the lever bar 62, the lever 60 may be pivoted so that end portions of the lower bar 62 and lever handle 65 come to bear on the ground as shown in FIG. 3 and so that the spare tire 18 slides partially off the channel member 50 to also bear against the ground and hence be available for use.

To mount the spare tire 18, the spare tire 18 is placed on a portion of the channel member 50. The lever handle 65 is then grasped and pulled rearwardly so as to pivot the L-shaped lever 60 about pin 61 and bring the lever bar 62 to bear against and push the spare tire 18 further into the channel member 50. It should be noted that a pulling, instead of a lifting operation is preformed at this point of the tire mounting operation. As the L-shaped lever 60 is pivoted by the pulling operation from its inverted orientation as shown in FIG. 3, the end of the lever handle 65 may scrape against the ground and hence the weight of the spare tire 18 bears on the ground.

After the L-shaped lever 60 has been pivoted so that the rod 63 and lever handle 65 extend rearwardly, the lever handle 65 is grasped and raised so as to slide the spare tire 18 still further onto the channel member 50. Simultaneously as the lever handle 65 is raised, the channel member 50 and yoke-like rod extensions 41, 42, tube 20 and conduits 25 pivot about rods 30, 31 so that the spare tire 18 is lifted off of the ground. As the lever handle 65 is raised to a substantially horizontal position, the lever bar 62 pushes the spare tire 18 fully onto the channel member 50 and rod portions 45, and against tire retaining rod portions 44 of the yoke extensions 41, 42. Simultaneously, the upper side of the tire 18 is brought to bear against transverse bar 15. The swing arm 70 is then swung toward and against the rod portion 63 so that the resilient end portion 78 slides under the rod portion 63, which then snaps down into the rounded, slotted seat 75. The pin 81 of the padlock 80 is subsequently inserted into the slot 79 and about the rod portion 63 to lock the tire holder 10 to the pickup truck 11.

It should be noted that the pair of rod extensions 44 and the lever bar 62 bear into and against the spare tire 18 at three points and the upper side of the tire bears against transverse bar 15. Hence, both horizontal and vertical movement may be minimized when the truck !1 is in operation. It should be further noted that the lever bar 62 accommodates tires of slightly different diameters because the bar 62 is depressable somewhat into the tire 18 and because a small amount of play exists about pin 61.

Figure 5:
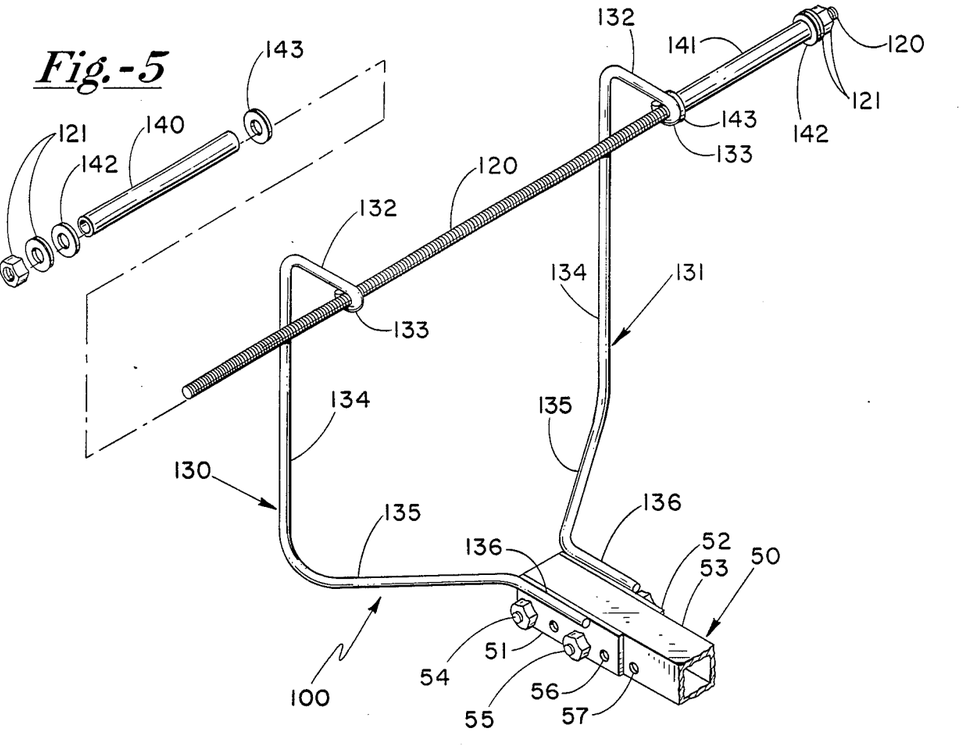
FIG. 5 shows a rear elevation view of a portion of an alternate embodiment of the tire holder.

In an alternate embodiment of the invention, as shown in FIG. 5, a tire holder 100 includes a transverse threaded rod 120 connected between the longitudinal frame members 13, 14 of the pickup truck 11. The transverse rod 120 is insertable through apertures formed in the frame members 13, 14 and affixed to the frame members 13, 14 via a lock bolt and washer means 121. The thickness of the spare tire 18 to be mounted in the tire holder 10 typically determines the height or altitude at which the apertures are formed in the frame members 13, 14.

A pair of yoke-like, rod extensions 130, 131 formed of a heavy gauge steel is pivotally connected to the transverse rod 120 to form a yoke or cradle for the spare tire 18. Each of the rod like extensions 130, 131 includes a horizontal frontwardly extending rod portion 132 with an eyelet 133 pivotally connected to the rod 120. An integral rod portion 134 extends downwardly from an end of the horizontal rod portion 132. An integral, inwardly and rearwardly extending rod portion 135 is connected to a lower end of rod portion 134. An integral, rearwardly extending rod portion 136 is connected to a rear end of rod portion 135. Rod portions 136 are welded to apertured channel plates 51, 52. It should be noted that the yoke-like rod extensions 130, 131 may be flat steel bars and that tire holder 100 may exclude rod portions 132, and rod portions 134 may be integral with eyelet portions 133 and be substantially upright.

A pair of tubular spacing conduits 140, 141 is mounted on each end of the threaded rod 120 between an inside face of its respective U-channel 13, 14 and its respective eyelet 133. A pair of washers 142, 143 is disposed between the U-channels 13, 14 and the conduits 140, 141 and between eyelets 133 and conduits 140, 141, respectively. One purpose of the conduits 140, 141 is to prevent the yoke-like rod extensions 130, 131 from spreading. The conduits 140, 141 may be crimped so as to prevent noise when the truck 11 is in operation.

Figure 6:
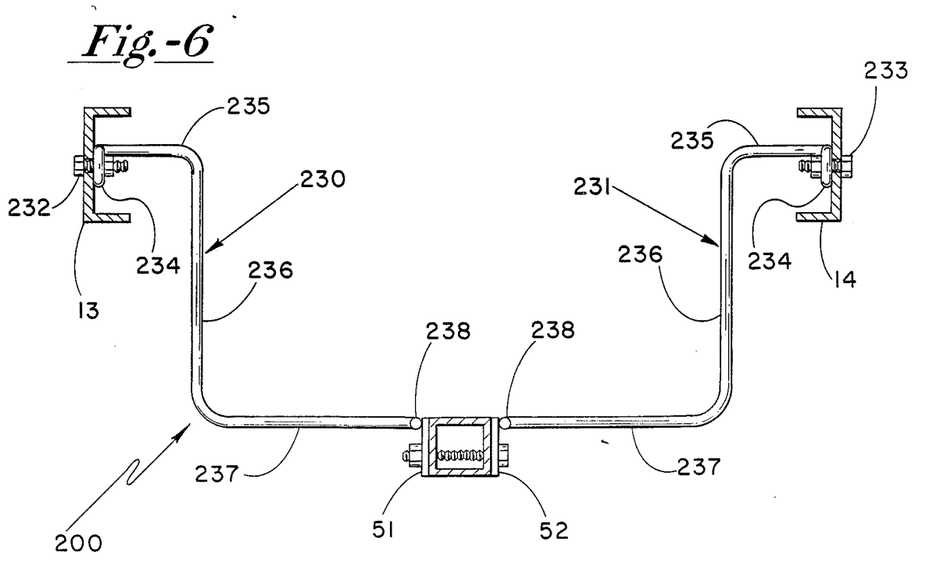
FIG. 6 shows a rear elevation view of a portion of an alternate embodiment of the invention.

In an alternate embodiment of the invention as shown in FIG. 6, a tire holder 200 includes a pair of yoke-like rod extensions 230, 231 which are pivotally connected to frame members 13, 14 via a pair of threaded respective lock bolt and washer means 232, 233. Each of the rod extensions 230, 231 include a bolt receiving eyelet 234 integrally connected to an inwardly extending rod portion 235. Each of the eyelets 234 is pivotally connected to the lock bolts 232, 233. A downwardly extending tire retaining rod portion 236 is integrally connected to the inner end of rod portion 235. An inwardly and rearwardly extending rod portion 237 is integrally connected to the lower end of rod portion 236. The channel pieces 51, 52 are rigidly connected such as by welding to integral horizontally disposed rear ends 238 of respective rod portions 237.

Figure 7:
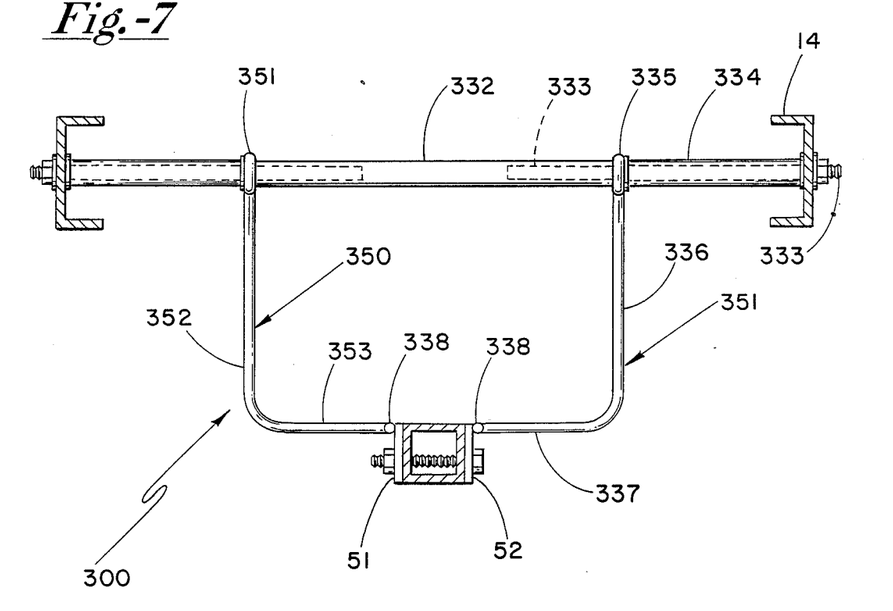
FIG. 7 shows a rear elevation view of a portion of an alternate embodiment of the invention.

In another alternate embodiment of the invention as shown in FIG. 7, a tire holder 300 includes a conduit section 332 which may rigidly or pivotally receive end portions of rods 333. The other ends of each of the rods 333 are affixed to the frame members 13, 14. A pair of conduit spacers 334 are disposed between the conduit 332 and the frame members 13, 14.

Yoke-like tire retaining rods 350, 351 include eyelets 335, 351 pivotally connected between conduit 332 and spacers 334. The eyelets 335, 351 are integrally connected to downwardly extending rod portions 336, 352. Lower ends of rod portions 336, 352 are integrally connected to rod portions 337, 353 which extend inwardly and rearwardly. The rear ends of rod portions 337, 353 are integrally connected to rearwardly extending, horizontally disposed rod portions 338 which are rigidly connected such as by welding to the channel pieces 51, 52.

It should be noted that rods 350, 351 may be one-piece bars. Rods 130, 131, 230, 231 may also be one-piece bars.

The present inVention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A tire holder for carrying a spare tire on an underside of a vehicle, the tire holder comprising:

tire supporting means for carrying the spare tire underneath the vehicle, the tire supporting means having a front end, and a rear end, and a tire mount disposed between the front and rear ends, the front end adapted to be swingingly connected to the vehicle so that the rear end may be disposed below the front end with the tire mount being angularly disposed relative the underside of the vehicle to allow the spare tire to be slideable off the tire mount, a lever swingably connected to the rear end of the tire supporting means, the lever including a handle portion and a tire bearing portion, the tire bearing portion being bearable against the spare tire for pushing and retaining the spare tire along and one the tire mount while the lever is being raised to lift the tire mount to a fixed position, and the tire bearing portion being swingable to an out of the away position relative to the tire to permit the tire to slide off the tire mount, and holding means for holding the handle portion fo the lever in a fixed position relative the tire supporting means and for holding the tire supporting means in a fixed position relative the vehicle, the holding means adapted to be connected to the vehicle and spaced from the rear end of the tire supporting means whereby the spare tire is mountable in an unobtrusive position underneath the vehicle by the lever pushing the spare tire onto the tire mount while the lever is being raised to lift the tire mount and whereby the spare tire is releasable by the spare tire being slideable off the tire mount to an accessible location on the periphery of the vehicle.

2. The tire holder of claim 1, wherein the handle and tire bearing portions are formed at generally a right angle, the tire bearing portion having proximal and distal ends with the proximal end being swingably connected to the rear end of the tire supporting means, the handle portion being connected to the tire bearing portion at a location closer to the distal end than the proximal end.

3. The tire holder of claim 1, wherein the holding means includes a swing arm swingably connected to and extending downwardly from the vehicle, the swing arm swingable and connectable to and away from the handle portion so as to engage and disengage the handle portion.

4. The tire holder of claim 3, wherein the swing arm includes a hook to provide a seat for the handle portion of the lever.

5. The tire holder of claim 3, wherein the swing arm includes an undulating portion for snapping the handle portion of the lever into the swing arm.

6. The tire holder of claim 3, further comprising a locking means for locking the swing arm to the lever, the locking means being connectable to the swing arm and handle portion of the lever.

7. The tire holder of claim 6 wherein the swing arm includes a slot, a portion of the locking means being insertable in the slot and about the handle portion of the lever to lock the lever to the swing arm.

8. The tire holder of claim 3, wherein the swing arm includes a pair of apertured bars, the bars being alignable and connectable to each other by a pin connector so that the swing arm is adjustable in length and whereby the tire holder may mount spare tires of different thicknesses.

9. The tire holder of claim 1, wherein the lever is pivotally connected to the tire mount via a pivot connection, the pivot connection and the tire mount disposed substantially in a common plane.

10. The tire holder of claim 1, wherein the tire bearing portion is disposable perpendicularly to the tire mount when the tire is being retained and parallel to the tire mount when the tire is being released, and the handle portion is disposable perpendicularly to the tire mount when the tire is being released and parallel to the tire mount when the tire is being retained.

11. The tire holder of claim 1, wherein the handle portion is adapted to be of sufficient length to extend to a portion of the periphery of the vehicle.

12. A tire holder for carrying a spare tire on an underside of a vehicle, the tire holder comprising:

tire supporting means for carrying the spare tire underneath the vehicle, the tire supporting means having a front end, a rear end, and a tire mount being disposed between the front and rear ends, the front end adapted to be swingingly connected to the vehicle so that the rear end may be disposed below the front end with the tire mount being angularly disposed relative the underside of the vehicle to allow the spare tire to be slideable off the tire mount, a lever swingably connected to the rear end of the tire supporting means, the lever including a handle portion and a tire bearing portion, the tire bearing portion being bearable against the spare tire for pushing and retaining the spare tire along and one the tire mount while the lever is being raised to lift the tire mount to a fixed position, and the tire bearing portion being swingable to an out of the way position relative to the tire to permit the tire to slide off the tire mount.

holding means for holding the lever in a fixed position relative the tire supporting means and for holding the tire supporting means in a fixed position relative the vehicle, the holding means adapted to be connected to the vehicle and spaced from the rear end of tire supporting means whereby the spare tire is mountable in an unobtrusive position underneath the vehicle by the lever pushing the spare tire onto the tire mount while the lever is being raised to lift the tire mount and whereby the spare tire is releasable by the spare tire being slideable off the tire mount to an accessible location on the periphery of the vehicle, and the front end of the tire supporting means including at least two tire retaining extensions, the tire retaining extensions and tire bearing portion of the lever forming a three point arrangement to limit movement of the spare tire, the three point arrangement being spaced from an independent of the holding means whereby the spare tire may be mounted deeply within the vehicle relative the holding means, whereby the holding means is mountable at different locations in different vehicles, and whereby the holding means is mountable on the periphery of the vehicle.

13. The tire holder of claim 12, wherein the tire supporting means includes an adjustable channel with at least two apertured, alignable plates so that the tire holder may mount spare tires of different diameters in the three point arrangement.

14. The tire holder of claim 12, wherein the tire supporting means includes a transverse member rotatably mounted to the vehicle, the tire retaining yoke-like extensions being adjustably connected to the transverse member so that the tire holder may mount tires of different thicknesses.

15. The tire holder of claim 14, wherein the transverse member includes a rod rigidly affixed to the vehicle and a conduit section disposed between the tire retaining extensions and the vehicle and being rotatable on the rod, the extensions being rigidly affixed relative the conduit section.

16. A tire holder for carrying a spare tire underneath a vehicle, the tire holder comprising:
   tire supporting means for carrying the spare tire underneath the vehicle, the tire supporting means having a front end and a rear end, the front end including a yoke-like member adapted to be pivotally connected to the vehicle so that the tire supporting means is swingable relative the vehicle and so that the rear end may be disposed below the front end to allow the spare tire to be slideable off of a portion of the tire supporting means, the yoke-like member including at least two tire retaining extensions, the rear end including an apertured two-piece adjustable channel connected to the yoke-like member so that the tire holder may mount spare tires of different diameters,
   an L-shaped lever swingably connected to the rear end of the tire supporting means, the lever including a handle portion and a tire bearing portion being bearable against the spare tire for pushing the spare tire into the tire holder while the lever is being raised to lift the tire holder to a fixed position, the handle portion including an axial bore for receiving a rod like member such as a tire iron for extending the length of the handle portion and increasing the leverage of the lever, the tire bearing portion and the yoke-like extensions forming a three point arrangement for lifting movement of the spare tire,
   holding means for holding the lever in a fixed position relative the tire supporting means and for holding the tire supporting means in a fixed position relative the vehicle, the holding means including a swing arm adapted to be pivotally connected to the vehicle and spaced from and independent of the three point arrangement so that the spare tire may be mounted deeply within the vehicle relative the holding means, the swing arm including a hook for providing a seat for the handle portion of the lever, an undulating portion for snapping the handle portion into the seat, and a slot for receiving a locking means for locking the swing arm to the lever, the swing arm further including a pair of bolt-receiving, apertured, alignable bars so that the tire holder may mount spare tires of different thicknesses whereby the spare tire is readily mountable in an unobtrusive position underneath the vehicle by the lever being pivoted and raised substantially simultaneously to push the spare tire into the tire holder and raise the tire holder relative the vehicle and whereby the spare tire is readily releasable from the tire holder by the tire supporting means being disengaged from the swing arm and swung down so that the tire is slideable off a portion of the tire supporting means to an accessible location on the periphery of the vehicle.

17. A tire holder for carrying a spare tire underneath a vehicle, the tire holder comprising:
   a pivotable transverse member adapted to be connectable underneath the vehicle, the transverse member being transversely adjustable to be adaptable for connection to different vehicles,
   a front tire retaining member adjustably connected to the transverse member, the tire retaining member being vertically adjustable relative the transverse member to accommodate tires of different thicknesses,
   a tire supporting member rigidly connected to the front tire retaining member and being longitudinally adjustable to accommodate tires of different diameters,
   a rear tire retaining member connected to the tire supporting member, the tire retaining member retaining the tire on the tire supporting member, and
   a swing arm adapted to be connectable to the vehicle and cooperating with the rear tire retaining member for holding the tire holder in a fixed position relative the vehicle, the swing arm being vertically adjustable to accommodate tires of different thicknesses, the swing arm being disconnectable from the rear tire retaining member so that the tire holder is swingable downwardly to allow ready removal and mounting of the spare tire whereby the tire holder is adjustable for connection to different trucks and is adjustable so as to accommodate tires of different thicknesses and diameters.

18. A tire holder for carrying a spare tire on the underside of a vehicle, the tire holder comprising:
   a tire retaining arrangement adapted to be swingably affixed to the underside of the vehicle with the arrangement including three tire retaining members for lifting transverse movement of the tire, the arrangement including a tire mount being angularly disposable relative the underside of the vehicle, one of the tire retaining members being swingably affixed to the arrangement and having a handle extension extending rearwardly of and being pivotally affixed to the arrangement, and the swinging member being swingable to an out of the way position relative to the tire to permit the tire to slide off the arrangement, and
   holding means adapted to be connectable to the underside of the vehicle near the periphery of the vehicle and spaced from the arrangement, the holding means being connectable to the handle extension for holding the arrangement in a fixed position relative the vehicle whereby the spare tire is mountable in the arrangement by the swinging member pushing the spare tire into the arrangement while the handle extension is being raised the lift the arrangement and tire into the fixed position and whereby the tire is disposed deeply in the vehicle yet slideable off the arrangement to an accessible location at the periphery of the vehicle.

19. A tire holder for carrying a spare tire underneath a vehicle, the tire holder comprising:
- a transverse member adapted to be connectable underneath the vehicle, the transverse member being transversely adjustable to be adaptable for connection to different vehicles,
- a front tire retaining member adjustably connected to the transverse member, the tire retaining member being vertically adjustable relative the transverse member to accommodate tires of different thicknesses,
- a tire supporting member rigidly connected to the front tire retaining member and being longitudinally adjustable to accommodate tires of different diameters,
- a rear tire retaining member connected to the tire supporting member, the tire retaining member retaining the tire on the tire supporting member, and
- a swing arm adapted to be connectable to the vehicle and cooperating with the rear tire retaining member for holding the tire holder in a fixed position relative the vehicle, the swing arm being vertically adjustable to accommodate tires of different thicknesses, the swing arm being disconnectable from the rear tire retaining member so that the tire holder is swingable downwardly to allow ready removal and mounting of the spare tire whereby the tire holder is adjustable for connection to different trucks and is adjustable so as to accommodate tires of different thicknesses and diameters.

* * * * *

UNITED STATES PATENT AND TRADEMARK OFFICE
CERTIFICATE OF CORRECTION

PATENT NO. : 4,964,552
DATED : October 23, 1990
INVENTOR(S) : Carl J. Terwilliger It is certified that error appears in the above-identified patent and that said Letters Patent is hereby corrected as shown below:

Column 4, line 42, delete "130, 131" and replace it with --30, 31--.

Column 4, line 46, delete "allow" and replace it with --allows--.

Column 7, line 4, delete "inVention" and replace it with --invention--.

Column 7, line 28, delete "one" and replace it with --on--.

Column 7, line 34, delete "fo" and replace it with --of--.

Column 8, line 43, delete "one" and replace it with --on--.

Column 8, line 67, delete "an" and replace it with --and--.

Column 9, line 50, delete "lifting" and replace it with --limiting--.

Column 10, line 64, after "raised" delete "the" and replace it with --to--.

Signed and Sealed this

Fourth Day of August, 1992

Attest:

DOUGLAS B. COMER

*Attesting Officer*  *Acting Commissioner of Patents and Trademarks*